(12) United States Patent
Lin et al.

(10) Patent No.: US 8,379,589 B2
(45) Date of Patent: Feb. 19, 2013

(54) NODE APPARATUS, NODE QUANTITY ADJUSTMENT METHOD, AND TANGIBLE MACHINE-READABLE MEDIUM FOR A SENSOR NETWORK

(75) Inventors: Chih-Yu Lin, Taipei (TW); Yung-Chih Liu, Taipei (TW); Che-Hsi Chuang, Taipei (TW); Yu-Chee Tseng, Hsinchu (TW)

(73) Assignee: Institute for Information Industry, Taipei (TW)

( * ) Notice: Subject to any disclaimer, the term of this patent is extended or adjusted under 35 U.S.C. 154(b) by 766 days.

(21) Appl. No.: 12/477,513

(22) Filed: Jun. 3, 2009

(65) Prior Publication Data
US 2010/0195515 A1    Aug. 5, 2010

(30) Foreign Application Priority Data
Feb. 3, 2009   (TW) ................................ 98103377 A

(51) Int. Cl.
*H04L 12/28*   (2006.01)
(52) U.S. Cl. .................... 370/330; 370/329; 370/279

(58) Field of Classification Search ................. 370/252, 370/330, 329, 279
See application file for complete search history.

(56) References Cited

U.S. PATENT DOCUMENTS

| | | | |
|---|---|---|---|
| 2006/0009246 A1* | 1/2006 | Marinier et al. | ............... 455/502 |
| 2007/0171050 A1* | 7/2007 | Westhoff et al. | ......... 340/539.22 |
| 2008/0253327 A1* | 10/2008 | Kohvakka et al. | ............ 370/330 |

* cited by examiner

*Primary Examiner* — Kibrom T Hailu
*Assistant Examiner* — Zewdu A Beyen
(74) *Attorney, Agent, or Firm* — Patterson Thuente Christensen Pedersen, P.A.

(57) ABSTRACT

A node apparatus and an adjusting method of a quantity of nodes for a sensor network and a tangible machine-readable medium thereof are provided. The sensor network comprises a plurality of groups, wherein each group has a plurality of nodes. For each group, one of the nodes is set to be a gate node, and each node within the group transmits at least one data of itself to the corresponded gate node. Each gate node calculates a data aggregation time based on a data length per unit time of received data and a predetermined packet length, so that each gate node is able to adjust the quantity of nodes within the group thereof accordingly.

21 Claims, 6 Drawing Sheets

NODE APPARATUS, NODE QUANTITY ADJUSTMENT METHOD, AND TANGIBLE MACHINE-READABLE MEDIUM FOR A SENSOR NETWORK

This application claims the benefit from the priority of Taiwan Patent Application No. 098103377 filed on Feb. 3, 2009, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a node apparatus, a node quantity adjustment method, and tangible machine-readable medium thereof for a sensor network. More specifically, the present invention relates to a node apparatus, a node quantity adjustment method, and tangible machine-readable medium thereof for reducing the data transmission loading in a sensor network.

2. Descriptions of the Related Art

Due to the fast development of wireless communication technology and the needs of environment monitoring, such as monitoring the consistency of carbon dioxide or water levels in tunnels, wireless sensor networks have been widely used to detect various changes in the environments over recent years.

In particular, sensors of the wireless sensor network can be deployed at different locations in a geographic environment, and these sensors are called nodes. Since the nodes communicate and transmit data with each other wirelessly, the wireless sensor network is flexible and does not need an extra charge for deployment. These nodes are configured to retrieve the surrounding environment information, such as temperature, humidity, consistency of gas, or movement of an object. The nodes then transmit the environmental information to a data sink (one of the nodes) to decipher changes in the geographic environment.

According to the property of the geographic environment, the topologies of wireless sensor networks can be divided into two types: a tree type or a link type. In the tree type wireless sensor network, the deployment of nodes has a higher density. Each node in the tree type wireless sensor network has several neighbor nodes. On the contrary, the nodes are deployed in line in the link type wireless sensor network. Usually, there are only two neighbor nodes.

However, the distance between the terminal nodes and data sink will be increased when the quantity of nodes in the wireless sensor network increases. To ensure that the data sink can receive data from the terminal nodes effectively, it consequently costs more resources (e.g. power) for the wireless sensor network to transmit data from the terminal nodes. Moreover, when the quantity of nodes increases, the data transmission that is loading in the wireless sensor network also increases at the same time to cause a higher packet missing rate. Based on the deployment property of the nodes, the problems described above will be more obvious in the link type wireless sensor network.

In view of this, it is important to improve the efficiency of data transmission and to reduce data loading in the wireless sensor networks.

SUMMARY OF THE INVENTION

One objective of the present invention is to provide a node apparatus for a sensor network. The sensor network comprises a plurality of groups which comprises a first group and a second group. The first group and the second group include a plurality of first nodes and a plurality of second nodes respectively. One of the first nodes is set as a first gate node, and one of the second nodes is set as a second gate node. The second gate node connects to one of the first nodes wirelessly.

The node apparatus of the present invention comprises a transmission module, a reception module, a memory, a calculation module, and an adjustment module. The reception module is configured to receive at least one data of each of the first nodes. The at least one data from each of the first nodes has a first unit time data length. The memory is configured to store a default packet length so that the calculation module can calculate a first data aggregation time of the first gate node according to the first unit time data length of the at least one data of each of the first nodes and the default packet length. The adjustment module is configured to adjust a quantity of the first nodes according to the first data aggregation time.

Another objective of the present invention is to provide a node quantity adjustment method for a sensor network. The sensor network comprises a plurality of groups which comprises a first group and a second group. The first group and the second group include a plurality of first nodes and a plurality of second nodes respectively. One of the first nodes is set as a first gate node, and one of the second nodes is set as a second gate node. The second gate node connects to one of the first nodes wirelessly.

The node quantity adjustment method comprises the following steps: (1) receiving at least one data of each of the first nodes, wherein the at least one data of each of the first nodes has a first unit time data length; (2) calculating a first data aggregation time of the first gate node according to the first unit time data length of the at least one data of each of the first nodes and a default packet length; and (3) adjusting a quantity of the first nodes according to the first data aggregation time.

This invention provides a tangible machine-readable medium storing a program which, when being executed, enables a node apparatus to execute the node quantity adjustment method for the wireless sensor network described above.

Accordingly, the nodes apparatus, the node quantity adjustment method and the tangible machine-readable medium thereof for a sensor network of the present invention can separate the nodes into a plurality groups to transmit the data by one group as a unit. In addition, the present invention further adjusts the quantity of the nodes of each group appropriately according to a data aggregation time of each gate node to improve the disadvantages of the prior art.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, the descriptions of these embodiments are only for purposes of illustration rather than limitations. It should be appreciated that in the following embodiments and the attached drawings, the elements not related directly to this invention are omitted from depiction and dimensional relationships among individual elements in the attached drawings are illustrated only for ease of understanding, and not limitation.

Figure 1A:
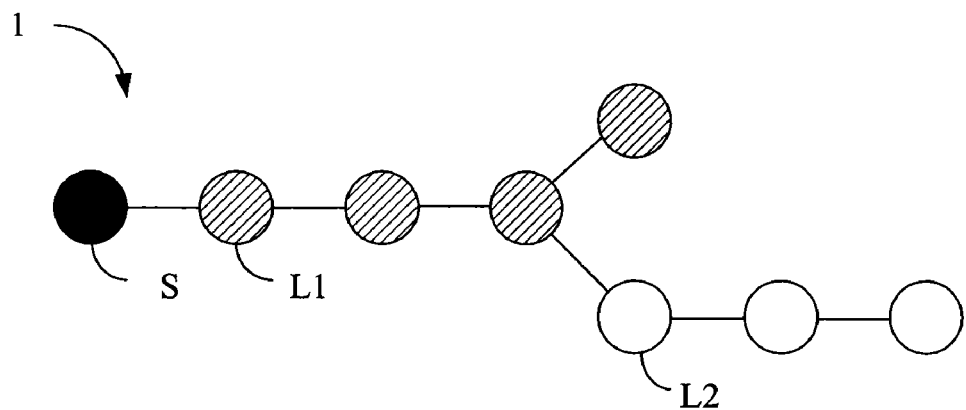
FIGS. 1A~1C are schematic diagrams illustrating the sensor network of a first embodiment of the present invention.
Figure 1B:
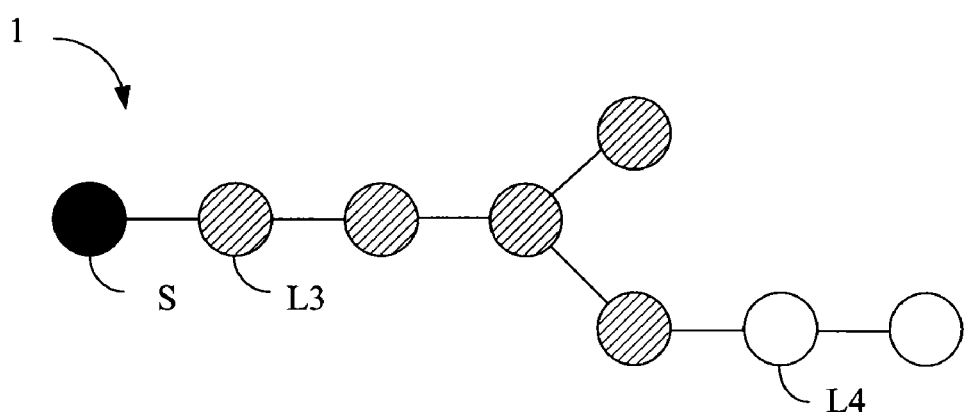
Figure 1C:
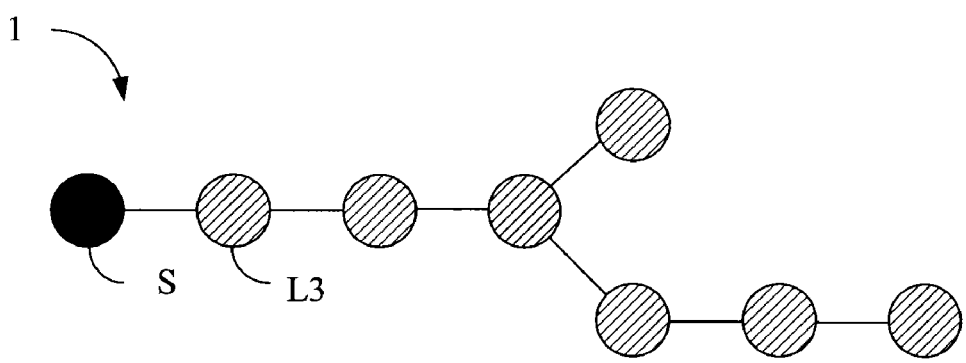
Figure 2:
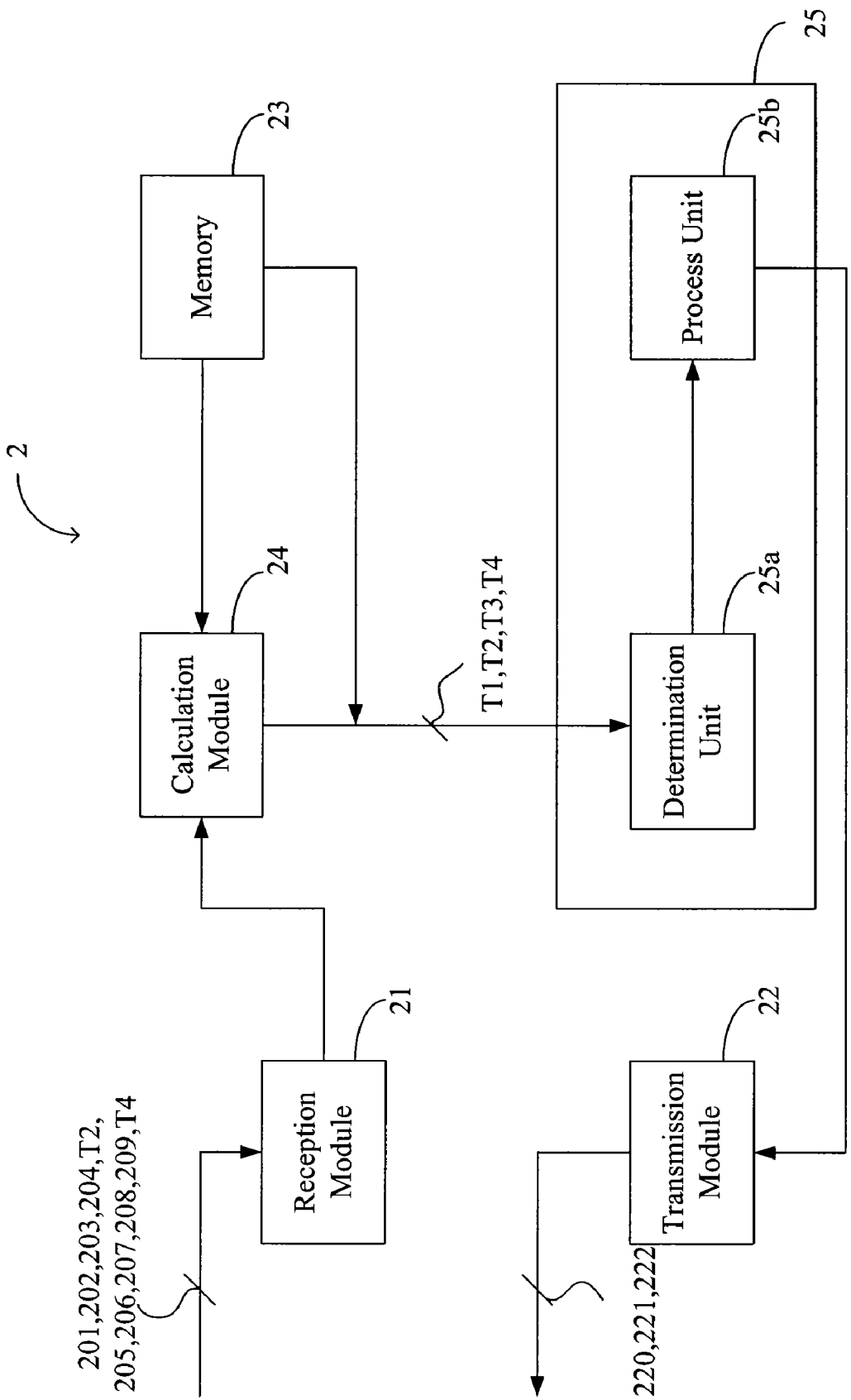
FIG. 2 is a schematic diagram illustrating the node apparatus of the first embodiment.

Thereinafter, the first embodiment, which is illustrated from FIG. 1A to FIG. 2, describes how the present invention increases a quantity of the nodes in the groups.

FIG. 1A illustrates a sensor network 1 that is wireless and adapted to one of the common wireless communication standards. In the first embodiment, the sensor network 1 is conformed to the IEEE 802.15 standard.

The network topology of the sensor network 1 has various branches which comprise a data sink S (the black dot in FIG. 1) and a plurality of nodes (the oblique dots and the white dots in FIG. 1). Before detection, the sensor network 1 separates the nodes into a plurality of groups. For example, the nodes can be separated equally or be separated according to the default parameters. It should be noted that the present invention doesn't limit the ways for separating the nodes. In this embodiment, the nodes are separated into a first group and a second group. More specifically, the first group includes four first nodes (oblique dots in FIG. 1A), and the second group includes three third nodes (white dots in FIG. 1A). The quantity of the nodes and the groups described above is only for purposes of illustration rather than limitations.

Then, the sensor network 1 sets one of the first nodes as a first gate node L1 and one of the second nodes as a second gate node L2. More specifically, the sensor network 1 selects the first and second nodes that are closest to the data sink S from the first gate node L1 and the second gate node L2 respectively, so that the first gate node L1 connects to the data sink S wirelessly and the second gate node L2 connects to one of the first nodes (the oblique dot located at the junction of the branches in FIG. 1A) wirelessly. It should be noted that the first gate node L1 and the second gate node L2 are aware of their locations to each other. In other words, a gate node of any group is aware of the locations of the gate nodes which are in the former and latter groups. The above system used for selecting gate nodes is well known to those of ordinary skill in the art, and thus will not be further described herein.

While detecting the environment, each gate node collects the data of its own group (including the data of the gate node). When the collection data accumulate to a certain amount, such as a default packet length, the gate node transmits the collection data as a packet, with the default packet length, to the data sink S. Herein, the default packet length is the maximum packet length that the sensor network 1 is configured to transmit and may be different under various wireless communication standards. In this embodiment, the default packet length is set at 102 bytes. Moreover, each of the gate nodes adjusts the node quantity of its own group periodically.

Furthermore, each of the first nodes and second nodes sets a node apparatus 2 individually. As shown in FIG. 2, the node apparatus 2 comprises a reception module 21, a transmission module 22, a memory 23, a calculation module 24, and an adjustment module 25 which has a determination unit 25a and a processing unit 25b. The default packet length is stored in the memory 23. The node apparatus 2 set in the first gate node L1 will be described hereinafter.

In reference to FIG. 1A and FIG. 2, the reception module 21 receives data 201, 202, 203, 204 from the first nodes (the oblique dots in FIG. 1A) during detection. Each of the data 201, 202, 203, 204 has a first unit time data length. After the data sink S transmits a token to the first gate node L1 to start the adjustment of the quantity of first nodes, the calculation module 24 calculates a first data aggregation time of the first gate node L1 according to the following formula:

$$T = \frac{P \times S}{\sum_{i=0}^{i=N-1} \lambda_i \times CR}$$

wherein T represents the first data aggregation time, P represents a data error rate, S represents the default packet length, $\lambda_i$ represents the first unit time data length of the data of each of the first nodes, N represents the quantity of the first nodes, and CR represents a data compression rate.

For example, if the parameters of the above formula are set as the following: S=102 bytes, N=4 (the quantity of the first nodes is four), each of the first unit time data length being $\lambda_0$=2.5 byte/min, $\lambda_1$=1.8 byte/min, $\lambda_2$=1.2 byte/min, $\lambda_3$=0.5 byte/min, P=1 (no data error), CR=1 (without compression), then the first data aggregation time obtained is 17 minutes. That is, it takes the first gate node L1 17 minutes to accumulate the data 201, 202, 203, 204 to the default packet length (102 bytes), and to transmit the data 201, 202, 203, 204 to the data sink S.

Besides the data error rate, the default packet length, the unit time data length of the data of each of the first nodes, and the data compression rate, those of ordinary skill in the art can add the coefficients that may influence the data aggregation time in accordance with different considerations, thus the present invention doesn't limit the calculation formula. Afterwards, the calculation module 24 transmits information T1 of the first data aggregation time (17 minutes) to the adjustment module 25, so that the adjustment module 25 adjusts the quantity of the first nodes according to the information T1.

Similarly, the second gate node L2 can calculate a second data aggregation time according to the method described above. In the other words, the second data aggregation time can be calculated according to a second unit time data length of the data of each of the second nodes, the default packet length, the data error rate, and the data compression rate. The reception module 21 receives information T2 of the second data aggregation time from the second gate node L2, and transmits the information T2 to the adjustment module 25.

After receiving the information T1 and T2, the determination unit 25a compares the information T1, the information T2, a default upper limit time, and a default lower limit time stored in the memory 23. Herein, the default upper limit time and the default lower limit time are related to the environment information which the sensor network 1 intends to detect. For example, the sensor network 1 may adjust the temperature and humidity once about every 5 to 10 minutes, so that the default upper limit time and the default lower limit time can be set to 10 and 5 minutes, respectively. The different values of the first data aggregation time, the second data aggregation time, the default upper limit time and the default lower limit time represent different meanings, respectively. More specifically, if the first data aggregation time/the second data aggregation time is between the default upper limit time and the default lower limit time (5 to 10 minutes), the sensor network 1 can adjust the temperature and the humidity according to the information from the first gate node/the second gate node in 5 to 10 minutes smoothly, so that the quantity of the first nodes/second nodes is exact without unnecessary adjustments. Then, if the first data aggregation time/the second data aggregation time is greater than the default upper limit time (10 minutes), the sensor network 1 has to wait more than 10 minutes to adjust the temperature and the humidity, so that the quantity of the first nodes/the second nodes isn't enough and needs to be increased. Finally, if the first data aggregation time/the second data aggregation time is less than the default lower limit time (5 minutes), the quantity of the first nodes/the second nodes is too much and needs to be reduced.

In this embodiment, the calculation result of the first data aggregation time is 17 minutes. The methods for adjusting the quantity of the first nodes according to the value of the second data aggregation time will be described hereinafter.

(1) The second data aggregation time is between the default upper limit time and the default lower limit time If the calculation result of the second data aggregation time is 8 minutes, the determination unit 25a determines that the first data aggregation time (17 minutes) is greater than the default upper limit time, and the second data aggregation time (8 minutes) is between the default lower limit time and the default upper limit time according to the information T1 and T2. At the same time, the processing unit 25b transmits a moving signal 220 via the transmission module 22 to move at least one of the second nodes (white dots in FIG. 1A) to the first nodes (oblique dots in FIG. 1A).

In reference to FIG. 1B, the setup of the second gate node L2 will be canceled temporarily to form a third group and a fourth group in response to the moving signal 220. The third group includes five third nodes (oblique dots in FIG. 1B), and the fourth group includes two fourth nodes (white dots in FIG. 1B). According to the moving signal 220, one of the third nodes is set as a third gate node L3, and one of the fourth nodes is set as a fourth gate node L4. With further reference to both FIG. 1A and FIG. 1B, the location of the third gate node L3 is substantially the location of the first gate node L1, and the location of the fourth node is the location of one of the second nodes.

Thereupon, the sensor network 1 is going to enter the detection period. Similarly, the reception module 21 receives the data 205, 206, 207, 208, 209 of the five third nodes. Each data 205, 206, 207, 208, 209 has a third unit data time length individually. The calculation module 24 calculates a third data aggregation time of the third gate node L3 according to the above formula, the third unit time data length of each of the data 205, 206, 207, 208, 209, and the default packet length. Then, the calculation module 24 transmits information T3 of the third data aggregation time to the adjustment module 25. In the meantime, the fourth gate node L4 also calculates a fourth data aggregation time according to a fourth unit time data length of each of the two fourth nodes and the default packet length. Then, the calculation module 24 transmits information T4 of the fourth data aggregation time to the adjustment module 25 via the reception module 21.

The determination module 25a will compare the information T3, the information T4, the default upper limit time and the default lower limit time.

When the determination unit 25a determines that the third data aggregation time and the fourth aggregation time are both between the default upper limit time and the default lower limit time (e.g. the third data aggregation time is 7 minutes and the fourth data aggregation time is 5 minutes), the processing unit 25b transmits a setting signal 211 via the transmission module 22 to set the fourth gate node as the second gate node. Therein, the quantity of the third nodes (e.g. 5) is substantially greater than the quantity of the first nodes (e.g. 4), and the quantity of the fourth nodes (e.g. 2) is substantially less than the quantity of the second nodes (e.g. 3), so that the quantity of the first nodes increases after the adjustment.

On the other hand, when the determination unit 25a determines that the third data aggregation time and the fourth data aggregation time are neither between the default upper limit time and the default lower limit time (e.g. the third data aggregation time is 13 minutes and the fourth data aggregation time is 3 minutes), the processing unit 25b repeats the steps described above to increase the quantity of the first nodes.

In this embodiment, the determination unit 25a determines that the third aggregation time and the fourth aggregation time are both between the default upper limit time and the default lower limit time. Therefore, the sensor network 1 transmits the data via the first group (oblique dots in the FIG. 1B) and the second group (white dots in the FIG. 1B) after adjustment.

In other embodiments, the adjustment module 25 moves the second nodes to the first nodes one by one, and then respectively calculates the corresponding data collection time to select the best combination. More specifically, if X represents the quantity of the first nodes and Y represents the quantity of the second nodes, the adjustment module 25 calculates the corresponding data aggregation times ordered from (X=4, Y=3), (X=5, Y=2), (X=6, Y=1). The first data aggregation times are T1(X=3, Y=4), T1(X=5, Y=2) and T1(X=6, Y=1), and the second data aggregation times are T2(X=4,Y=3), T2(X=5,Y=2) and T2(X=6,Y=1). The adjustment module 25 will select the best combination from the three circumstances. The best combination is to satisfy the condition so that the first data aggregation time and the second data aggregation time are both between the default upper limit time and the default lower limit time, and the absolute value of difference of the first data aggregation time and the second data aggregation time is the smallest.

(2) The second data aggregation time is greater than the default upper limit time If the calculation result of the second data aggregation time is 20 minutes, the determination unit 25a determines that the first aggregation time (17 minutes) and the second data aggregation time (20 minutes) are both greater than the default upper limit time (10 minutes) according to the information T1 and T2 respectively. This means that the sensor network 1 has to wait more time than the default upper limit time (10 minutes) to adjust the temperature and the humidity. In the other words, the quantity of the first nodes (oblique dots in FIG. 1A) and the quantity of the second nodes (white dots in FIG. 1A) are both insufficient. As shown in FIG. 1C, the processing unit 25b transmits a cancellation signal 222 via the transmission module 22 to cancel the setup of the second gate node L2 to form a third group (oblique dots in FIG. 1C). Comparing with FIG. 1A and FIG. 1C, the location of the third gate node L3 is substantially the location of the first gate node L1 and the quantity of the third nodes (e.g. 7) is the sum of the quantity of the first nodes (e.g. 4) and the second nodes (e.g. 3), so that the quantity of the first nodes increases after the adjustment.

Thus, the adjustment of the quantity of the first nodes is done. Afterwards, the first gate node L1 transmits the token to the next gate node, such as the second gate node, to inform the next gate node of continuing the progress of the node quantity adjustment.

It should be appreciated that the order of node quantity adjustment is to progress from the data sink S to the terminal gate nodes in the first embodiment. In other embodiments, it can progress vice versa.

The above description is to illustrate the increasing quantity of the nodes in the groups. The second embodiments illustrated from FIG. 3A to FIG. 4 will later be expressed to explain how to reduce the quantity of the nodes. It should be noted that the differences between the first embodiment and the second embodiment is about the topology of the network and the way to adjust the nodes. The differences between the first embodiment and the second embodiment will be further described in the following description.

Figure 3A:
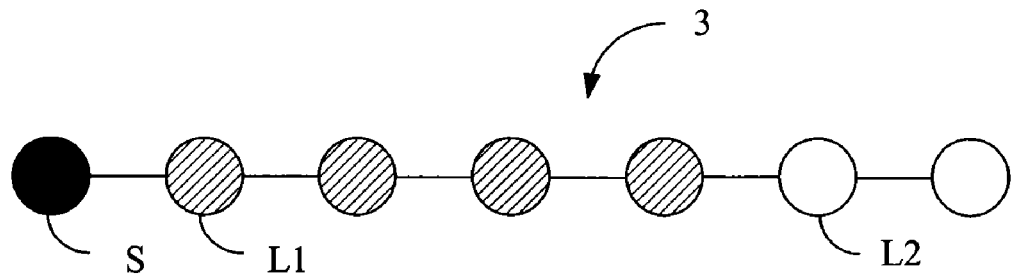
FIGS. 3A~3C are schematic diagrams illustrating the sensor network of a second embodiment.

FIG. 3A illustrates a sensor network 3 which is substantially a wireless sensor network adapted to one of the common wireless communication standards. As for the second embodiment, the sensor network 3 is conformed to the IEEE 802.15 standard.

The sensor network 3 has no branch and comprises a data sink S and a plurality of nodes (oblique dots and white dots in FIG. 3A). Before detection, the sensor network 3 separates the nodes into a plurality of groups. In this embodiment, the nodes are separated into a first group and a second group. More specifically, the first group includes four first nodes (oblique dots in FIG. 3A), and the second group includes two second nodes (white dots in FIG. 3A). The quantity of the nodes and the groups described above is only for purposes of illustration rather than limitations.

Thereinafter, the sensor network 3 sets one of the first nodes, which is closer to data sink S, as a first gate node L1 and sets one of the second nodes, which is also closer to data sink S, as a second gate node L2, so that the first gate node L1 connects with the data sink S and the second gate node L2 connects with one of the first nodes (the most right oblique dot in FIG. 3A) wirelessly.

Figure 4:
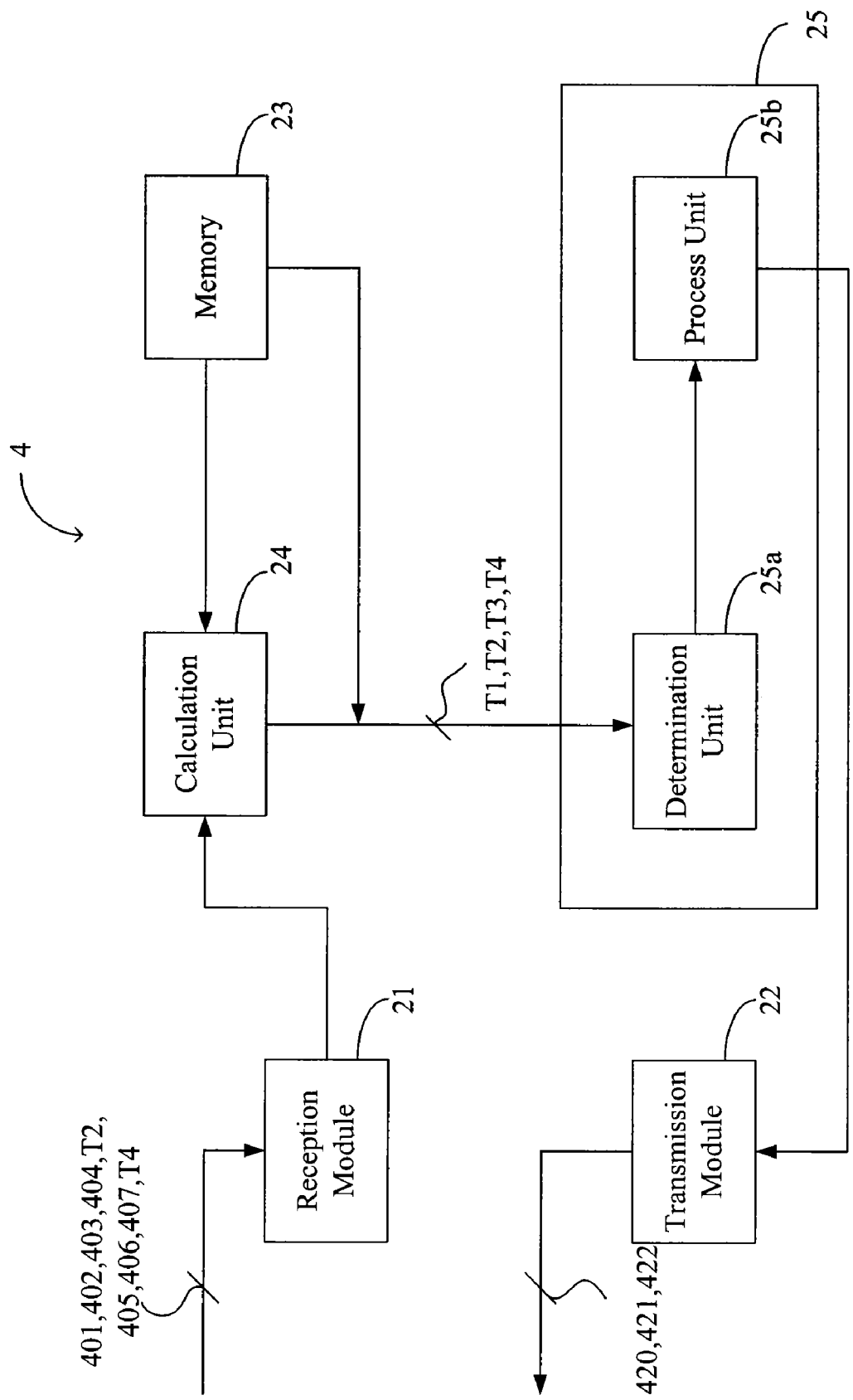
FIG. 4 is a schematic diagram illustrating the node apparatus of the second embodiment.

In reference to FIG. 4, each of the first nodes and the second nodes sets a node apparatus 4 individually. The same symbols in FIG. 4 and FIG. 2 are all clarified in the first embodiment, so that the same symbols will not be further described herein. The node apparatus 4 set in the first gate node L1 will be used to explain hereinafter.

In reference to FIG. 3A and FIG. 4, the reception module 21 receives data 401, 402, 403, 404 from the first nodes (oblique dots in FIG. 3A) while detecting. Each data 401, 402, 403, 404 has an individual first unit time data length. When the data sink S transmits a token to notify the first gate node L1 to adjust the quantity of the first nodes, the calculation module 24 calculates a first data aggregation time of the first gate node according to the formula described in the first embodiment.

For example, if the parameters in the formula are set as the following, S=102 byte, N=4 (the quantity of the first nodes is four), each of the first unit time data length being $\lambda_0$=8 byte/min, $\lambda_1$=7.5 byte/min, $\lambda_2$=6 byte/min, $\lambda_3$=5.5 byte/min, P=1 (no data error), and CR=1 (without compression), then the first data aggregation time is 3.78 minutes. The meaning of the first data aggregation time is that the first gate node L1 costs 3.78 minutes to accumulate the data 401, 402, 403, 404 to the default packet length (102 bytes), and to transmit the data 401, 402, 403, 404 to the data sink S.

Then, the calculation module 24 transmits information T1 of the first data aggregation time (3.78 minutes) to the adjustment module 25, so that the adjustment module 25 could adjust the quantity of the first nodes according to the information T1. Similarly, the second gate node L2 could calculate the second data aggregation time according to the method described above. In the other words, the second data aggregation time can be calculated according to a second unit time data length of each data of the second nodes, the default packet length, the data error rate, and the data compression rate. The reception module 21 receives information T2 of the second data aggregation time from the second gate node L2 and transmits the information T2 to the adjustment module 25.

After receiving the information T1 and T2, the determination unit 25a compares the information T1, the information T2, a default upper limit time, and a default lower limit time stored in the memory 23. For example, with temperature and humidity, the default upper limit time and the default lower limit time may be set to 10 and 5 minutes respectively.

In the second embodiment, the calculation result of the first data aggregation time is 3.78 minutes. The method for adjusting the quantity of the first nodes according to the value of the second data aggregation time will be described hereinafter.

(1) The second data aggregation time is between the default upper limit time and the default lower limit time If the calculation result of the second data aggregation time is 8 minutes, the determination unit 25a determines that the first data aggregation time (3.78 minutes) is less than the default lower limit time (5 minutes) according to the information T1 and T2, and the second data aggregation time (8 minutes) is between the default lower limit time and the default upper limit time (5 to 10 minutes) according to the same information T1 and T2. In the meantime, the processing unit 25b transmits a moving signal 420 via the transmission module 22 to move at least one of the first nodes (oblique dots in FIG. 3A) to the second nodes (white dots in FIG. 3A).

Figure 3B:
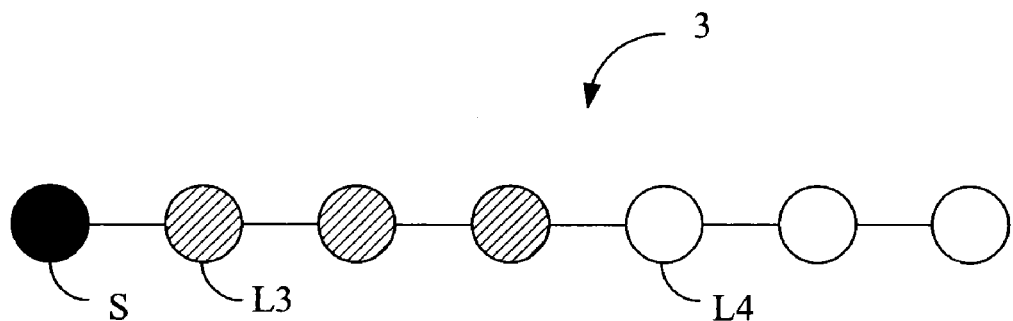

In reference to FIG. 3B, the setup of the second gate node L2 will be cancelled temporarily to form a third group and a fourth group in response to the moving signal 420. The third group includes three third nodes (oblique dots in FIG. 3B), and the fourth group includes three fourth nodes (white dots in FIG. 3B). According to the moving signal 420, one of the third nodes is set as a third gate node L3, and one of the fourth nodes is set as a fourth gate node L4. In reference to FIG. 3A and FIG. 3B, the location of the third gate node L3 is substantially the location of the first gate node L1, and the location of the fourth gate node L4 is the location of one of the first nodes.

Thereupon, the sensor network 3 is going to enter the detection period. Similarly, the reception module 21 receives the data 405, 406, 407 from the three third nodes. Each data 405, 406, 407 has an individual third unit time data length. The calculation module 24 calculates a third data aggregation time of the third gate node L3 according to the formula described above, the third unit time data lengths of the data 405, 406, 407, and the default packet length. Then, the calculation module 24 transmits information T3 of the third data aggregation time to the adjustment module 25. At the same time, the fourth gate node L4 also calculates a fourth data aggregation time according to a fourth unit time data length of the data of each of the three fourth nodes and the default packet length. Then, the calculation module 24 also transmits information T4 to the adjustment module 25 via the reception module 21.

The determination module 25a compares the information T3, the information T4, the default upper limit time, and the default lower limit time.

When the determination unit 25a determines that the third data aggregation time and the fourth aggregation time are both between the default upper limit time and the default lower limit time (e.g. the third data aggregation time is 6 minutes and the fourth data aggregation time is 7 minutes), the processing unit 25b transmits a setting signal 421 via the transmission module 22, so that the fourth gate node L4 is set as the second gate node according to setting signal 421. Because the quantity of the third nodes (e.g. 3) is substantially less than the quantity of the first nodes (e.g. 4), and the quantity of the fourth nodes (e.g. 3) is substantially greater than the quantity of the second nodes (e.g. 2), the quantity of the first nodes is reduced after the adjustment.

On the other hand, when the determination unit 25*a* determines that the third data aggregation time and the fourth data aggregation time are neither between the default upper limit time and the default lower limit time (e.g. the third data aggregation time is 4 minutes and the fourth data aggregation time is 8 minutes), the processing unit 25*b* repeats the steps described above to reduce the quantity of the first nodes.

In the second embodiment, the determination unit 25*a* determines that the third aggregation time and the fourth aggregation time are both between the default upper limit time and the default lower limit time. Hence, the sensor network 3 transmits the data via the first group (oblique dots in the FIG. 3B) and the second group (white dots in the FIG. 3B) after the adjustment.

In other embodiments, the adjustment module 25 moves the first nodes to the second nodes one by one, and then respectively calculates the corresponding data collection time to select the best combination. More specifically, if X represents the quantity of the first nodes and Y represents the quantity of the second nodes, the adjustment module 25 calculates the corresponding data aggregation times ordered from (X=4, Y=2), (X=3, Y=3), (X=2, Y=4), (X=1, Y=5). The first data aggregation times are T1(X=4, Y=2), T1(X=3, Y=3), T1(X=2, Y=4) and T1(X=1, Y=5), and the second data aggregation times are T2(X=4, Y=3), T2(X=5, Y=2), T2(X=6, Y=1) and T2(X=1, Y=5). The adjustment module 25 will select the best combination from the four circumstances. The best combination is to satisfy the condition that the first data aggregation time and the second data aggregation time are both between the default upper limit time and the default lower limit time, and the absolute value of difference of the first data aggregation time and the second data aggregation time is the smallest.

(2) The second data aggregation time is less than the default lower limit time

If the calculation result of the second data aggregation time is 4 minutes, the determination unit 25*a* determines that the first aggregation time (3.78 minutes) and the second data aggregation time (4 minutes) are both less than the default lower limit time (5 minutes) according to the information T1 and T2. This means that the changing speed of the temperature and the humidity in the sensor network 3 is too fast to cause unnecessary consumption. More specifically, the quantity of the first nodes (oblique dots in FIG. 3A) and the quantity of the second nodes (white dots in FIG. 3A) are too much to increase the changing speed of the temperature and the humidity.

Figure 3C:
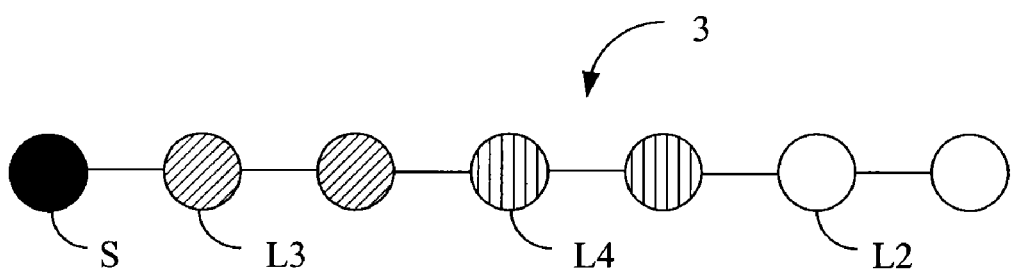

As shown in FIG. 3C, the processing unit 25*b* transmits a separating signal 422 to separate the first nodes (oblique dots in FIG. 3A) into a third group (oblique dots in FIG. 3C) and a fourth group (lined dots in FIG. 3C). The third group includes two third nodes, and one of the third nodes is set as a third gate node L3. The fourth group includes two fourth nodes, and one of fourth nodes is set as a fourth gate node L4. In reference to FIG. 3A and FIG. 3C, the location of the third gate node L3 is substantially the location of the first gate node L1, and the location of the fourth gate node L4 is substantially the location of one of the first nodes (oblique dots in FIG. 3A). The quantity of the first nodes (e.g. 4) is the sum of the quantity of the third nodes (e.g. 2) and the quantity of the fourth nodes (e.g. 2). Hence, the quantity of the first nodes is reduced after the adjustment.

So far, the adjustment of the quantity of the first nodes is done. Afterwards, the first gate node L1 transmits the token to the next gate node, such as the second gate node L2, to inform the next gate node to continue the progress of the node quantity adjustment.

It should be appreciated that the order of node quantity adjustment is to progress from the data sink S to the terminal gate nodes in the second embodiment. In other embodiments, it can progress vice versa.

Figure 5A:
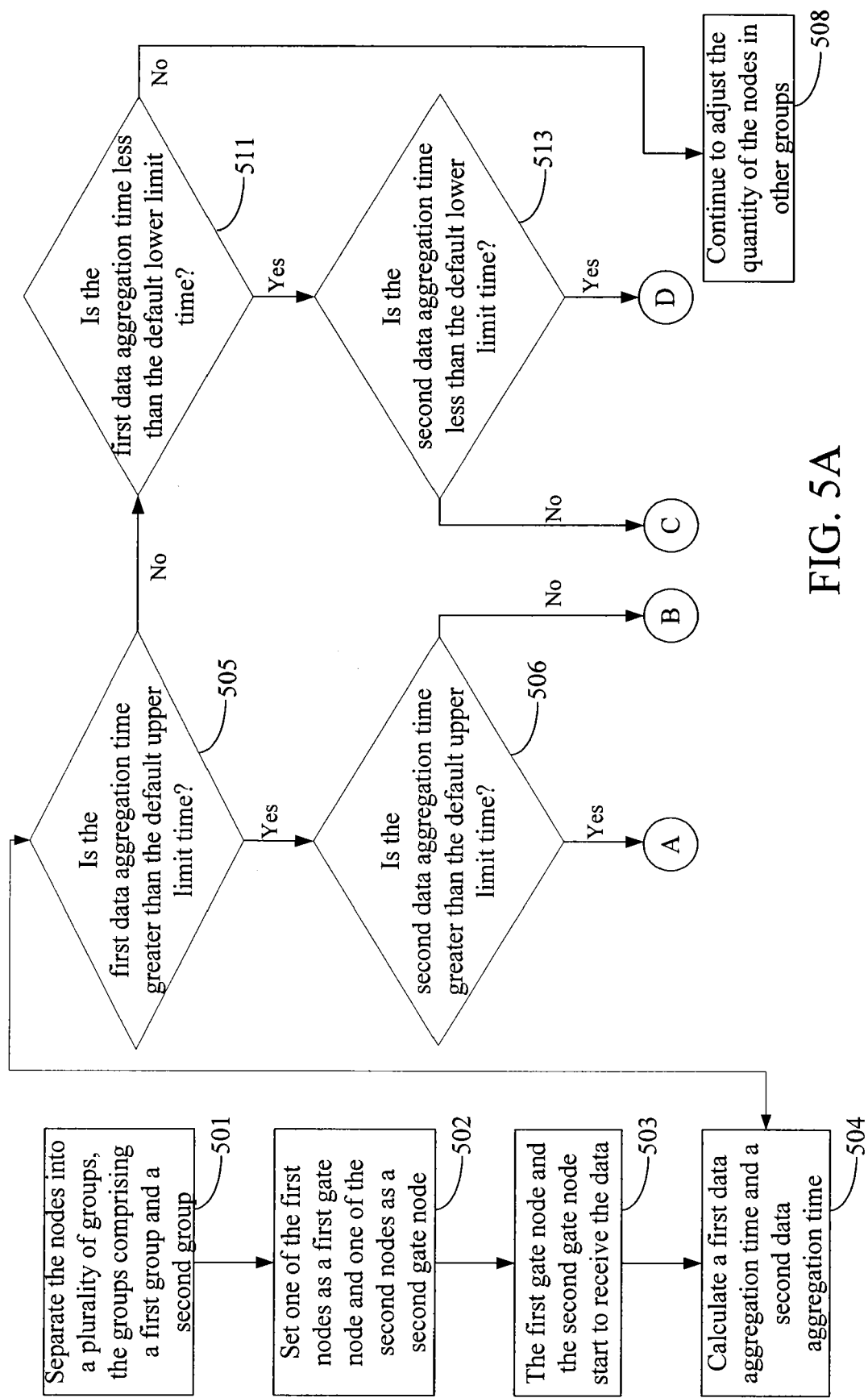
FIGS. 5A~B are schematic diagrams illustrating a third embodiment of the present invention.
Figure 5B:
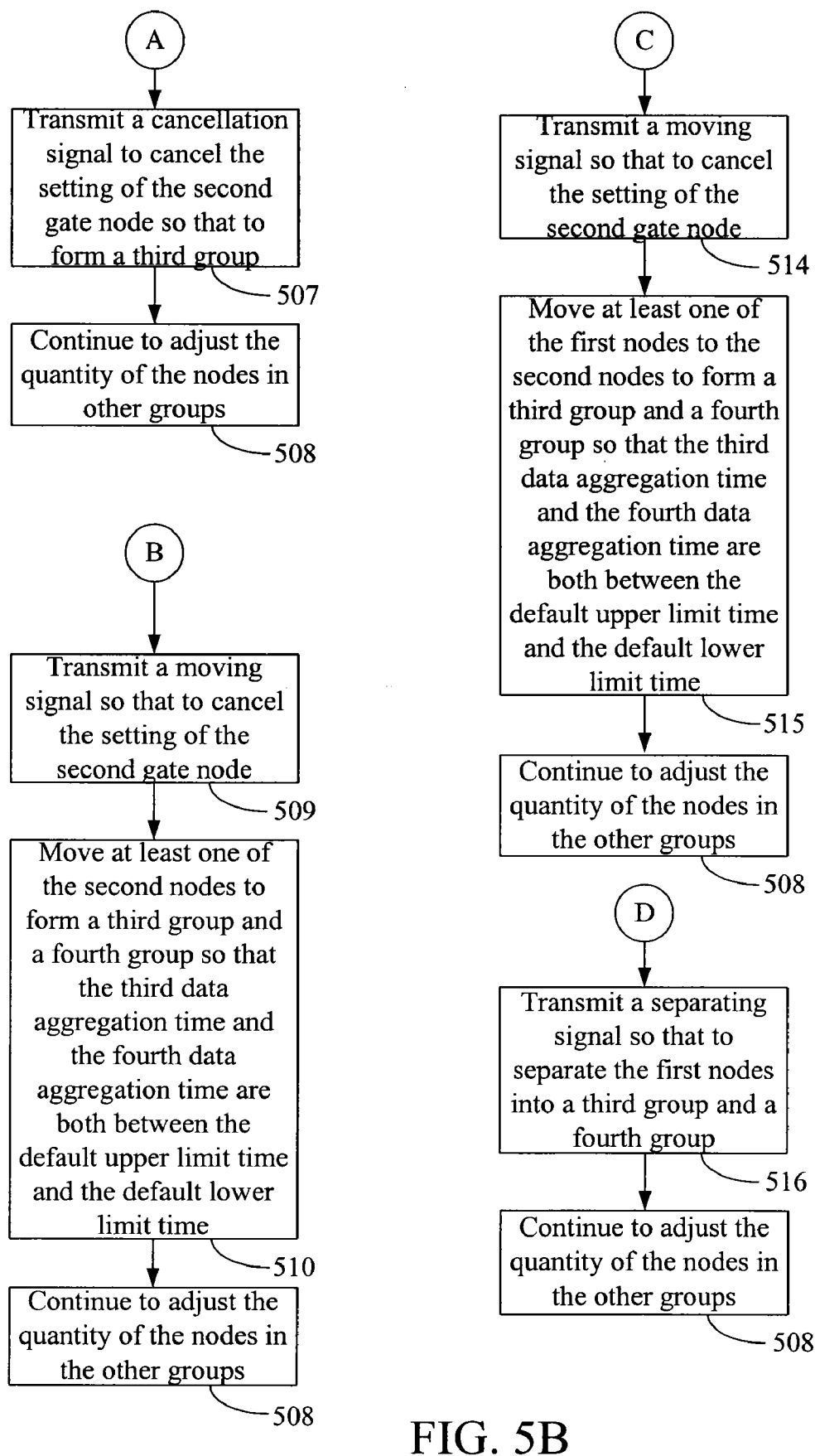

In the topology of the first embodiment, the prior art needs to transmit 45 packets, but it just needs to transmit only 11 packets after the initial nodes separate in FIG. 1A. In the topology of the second embodiment, the prior art needs to transmit 21 packets, but it just needs to transmit only 12 packets after the initial nodes separate in FIG. 3A. Accordingly, the transmission method of separating the nodes into groups can substantially reduce the transmitted packets, and adjusting the groups periodically can make data collection of the sensor networks 1, 3 more efficient. The third embodiment of the present invention shown in FIG. 5A and FIG. 5B is a node quantity adjustment method for a sensor network, such as the sensor network 1 in the first embodiment or the sensor network 3 in the second embodiment. The node quantity adjustment method is adapted for use in a node apparatus, such as the node apparatus 2 described in the first embodiment or the node apparatus 4 described in the second embodiment. The sensor networks 1, 3 include a plurality of nodes individually.

More specifically, the node quantity adjustment method described in the third embodiment may be implemented by a computer program product. When the computer program product is loaded into the node apparatus 2, the node apparatus 4 via a computer and a plurality of codes of the computer program product is executed, the node quantity adjustment method of the third embodiment can be accomplished. The computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The node quantity adjustment method of the third embodiment comprises the following steps. Step 501 is executed to separate the nodes into a plurality of groups. The separating method is described in the first embodiment and the second embodiment, and thus will not be further described. Wherein, the groups comprise a first group and a second group. The first group and the second group include a plurality of first nodes and a plurality of second nodes respectively. Step 502 is executed to set one of the first nodes as a first gate node and to set one of the second nodes as a second gate node. The second gate node connects to one of the first nodes wirelessly. Step 503 is executed for the first gate node to receive at least one data from each of the first nodes, wherein the data of each of the first nodes has a first unit time data length. Meanwhile, the second gate node receives at least one data from each of the second nodes, wherein the data of each of the second nodes has a second unit time data length.

When the first gate node starts to adjusts the quantity of the first nodes, step 504 is executed for the first gate node and the second gate node to calculate a first data aggregation time and a second data aggregation time according to the following formula:

$$T = \frac{P \times S}{\sum_{i=0}^{i=N-1} \lambda_i \times CR}$$

wherein T represents the first data aggregation time, P represents a data error rate, S represents the default packet length, $\lambda_i$ represents the first unit time data length of the data of each of the first nodes, N represents the quantity of the first nodes, and CR represents a data compression rate. The detailed description of the calculation is described in the first embodiment and the second embodiment, and thus will not be further described.

Then, step 505 is executed for the first gate node to determine whether the first data aggregation time is greater than a default upper limit time or not. If so, the node quantity adjustment method then executes step 506 to determine whether the second data aggregation time is greater than the default upper limit time or not. If the second data aggregation time is determined to be greater than the default upper limit time in step 506, step 507 is executed to transmit a cancellation signal to cancel the setup of the second gate node, so that a third group is formed. The third group includes a plurality of third nodes, and one of the third nodes is set as a third gate node according to the cancellation signal. The third gate node is substantially the first gate node, and the quantity of the third nodes is the sum of the quantity of the first nodes and the second nodes. The detailed description is described in the first embodiment, and thus will not be further described. After the adjustment of the quantity of the first nodes, step 508 is executed to continue to adjust the quantity of the nodes in other groups. If the second data aggregation time is determined to not be greater than the default upper limit time in step 506, step 509 is executed to transmit a moving signal to cancel the setup of the second gate node. Meanwhile, step 510 is executed to move at least one of the second nodes to the first group to form a third group and a fourth group. The third group and the fourth group include a plurality of third nodes and plurality of fourth nodes respectively. One of the third nodes is set as a third gate node, and one of the fourth nodes is set as a fourth gate node according to the moving signal. In step 510, the third gate node receives at least one data of each of the third nodes to calculate a third data aggregation time of the third gate node according to a third unit time data length of the data of each of the third nodes and a default packet length. Similarly, the fourth data aggregation time can be calculated by the fourth gate node according to a fourth unit time data length of at least one data of the fourth nodes and the default packet length. The third gate node is substantially the first gate node, and the fourth gate node is substantially one of the second nodes.

After receiving the fourth data aggregation time, the third gate node determines that the third data aggregation time and the fourth data aggregation time are both between the default upper limit time and a default lower limit time in step 510, and then transmits a setting signal to set the fourth gate node as the second gate node. The quantity of the third nodes is substantially greater than the quantity of the first nodes, and the quantity of the fourth nodes is substantially less than the quantity of the second nodes. Then, step 508 is executed to continue to adjust the quantity of the nodes in other groups.

If the first data aggregation time is determined not to be greater than the default upper limit time in step 505, then step 511 is executed to determine whether the first data aggregation time is less than a default lower limit time or not. If so, step 508 is executed to continue to adjust the quantity of the nodes in other groups.

If the first data aggregation time is determined to be less than the default lower limit time in step 511, then step 513 is executed to determine whether the second data aggregation time is less than the default lower limit time or not.

If the second data aggregation time is determined to not be less than the default lower limit time in step 513, then step 514 is executed to transmit a moving signal to cancel the setup of the second gate node. Meanwhile, step 515 is executed to move at least one of the first nodes to the second group to form a third group and a fourth group. The third group and the fourth group include a plurality of third nodes and a plurality of fourth nodes respectively. Step 515 is executed to set one of the third nodes as a third gate node and one of the fourth nodes as a fourth gate node according to the moving signal. The third gate node is substantially the first gate node, and the fourth gate node is substantially one of the first nodes.

The third gate node receives at least one data of each of the third nodes in step 515, and then calculates a third data aggregation time according to a third unit time data length of the data of each of the third nodes and the default packet length. Similarly, the fourth gate node calculates the four data aggregation time according to the fourth unit time data length of the data of each of the fourth nodes and the default packet length.

After receiving the fourth data aggregation time, the third gate node determines that the third data aggregation time and the fourth data aggregation time are both between the default upper limit time and the default lower limit time in step 515. Step 515 is executed to transmit a setting signal to set the fourth gate node as the second gate node. The quantity of the third nodes is substantially less than the quantity of the first nodes, and the quantity of the fourth nodes is substantially greater the quantity of the second nodes. And then, step 508 is executed to continue to adjust the quantity of the nodes in other groups.

If the second data aggregation time is determined less than the default lower limit time in step 513, step 516 is executed to transmit a separating signal to separate the first nodes into a third group and a fourth group. The third group and the fourth group include a plurality of the third nodes and a plurality of the fourth nodes respectively. Afterwards, one of the third nodes is set as a third gate node, and one of the fourth nodes is set as a fourth gate node according to the separating signal. The third gate node is substantially the first gate node and the fourth gate node is substantially one of the first nodes. The quantity of the first nodes is the sum of the quantity of the third nodes and the quantity of the fourth nodes. Finally, step 508 is executed to continue to adjust the quantity of the nodes in other groups.

As above, the data packets transmitted in the sensor networks can be reduced according to the node apparatus, the node quantity adjustment method, and the tangible machine-readable medium thereof of the present invention. Meanwhile, the sensor networks can collect the data more efficient via adjusting the quantity of the nodes in the groups periodically.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A node quantity adjustment method for a sensor network, the sensor network comprising a plurality of groups, the groups comprising a first group and a second group, the first group including a plurality of first nodes, one of the first nodes being set as a first gate node, the second group including a plurality of second nodes, one of second nodes being set as a second gate node, wirelessly connecting to one of the first nodes, the method comprising the steps of:

receiving at least one data, having a first unit time data length, from each of the first nodes;

calculating a first data aggregation time of the first gate node according to the first unit time data length of the at least one data of each of the first nodes and a default packet length, wherein the first data aggregation time is the time of accumulating the at least one data and the time of transmitting the at least one data to a sink node; and adjusting a quantity of the first nodes according to the first data aggregation time;

wherein the first data aggregation time is calculated according to a follow equation:

$$T = \frac{P \times S}{\sum_{i=0}^{i=N-1} \lambda_i \times CR}$$

wherein T represents the first data aggregation time, P represents a data error rate, S represents the default packet length, $\lambda_i$ represents the first unit time data length of the at least one data of each of the first nodes, N represents the quantity of the first nodes, and CR represents a data compression rate.

2. The node quantity adjustment method as claimed in claim 1, wherein the step of adjusting the quantity of the first nodes further comprises the steps of:

determining that the first data aggregation time is greater than a default upper limit time;

transmitting a moving signal to move at least one of the second nodes to the first group, so that to cancel the set of the second gate node, and to form a third group and a fourth group, wherein the third group comprises a plurality of third nodes, one of the third nodes is set as a third gate node according to the moving signal, the fourth group comprises a plurality of fourth nodes, and one of the fourth nodes is set as a fourth gate node according to the moving signal;

receiving at least one data, having a third unit time data length, from each of the third nodes;

calculating a third data aggregation time of the third gate node according to the third unit time data length of the at least one data of each of the third nodes and the default packet length; and receiving a fourth data aggregation time, being calculated according to a fourth unit time data length of at least one data of each of the fourth nodes and the default packet length, from the fourth gate node;

wherein the third gate node is the first gate node, and the fourth gate node is one of the second nodes.

3. The node quantity adjustment method as claimed in claim 2, wherein the step of adjusting the quantity of the first nodes further comprises the steps of:

determining that the third data aggregation time and the fourth data aggregation time are both between the default upper limit time and a default lower limit time; and transmitting a setting signal to set the fourth gate node as the second gate node;

wherein a quantity of the third nodes is greater than the quantity of the first nodes, and a quantity of the fourth nodes is smaller than a quantity of the second nodes.

4. The node quantity adjustment method as claimed in claim 1, wherein the step of adjusting the quantity of the first nodes further comprises the steps of:

receiving a second data aggregation time, being calculated according to a second unit time data length of at least one data of each of the second nodes and the default packet length, from the second gate node;

determining that the first data aggregation time and the second data aggregation time are both greater than a default upper limit time; and transmitting a cancellation signal to cancel the set of the second gate node, so that to form a third group, wherein the third group comprises a plurality of third nodes, and one of the third nodes is set as a third gate node according to the cancellation signal;

wherein the third gate node is the first gate node, a quantity of the third nodes is a sum of a quantity of the first nodes and a quantity of the second nodes.

5. The node quantity adjustment method as claimed in claim 1, wherein the step of adjusting the quantity of the first nodes further comprises the steps of:

determining that the first data aggregation time is smaller than a default lower limit time;

transmitting a moving signal to move at least one of the first nodes to the second group, so that to cancel the set of the second gate node, and to form a third group and a fourth group, wherein the third group comprises a plurality of third nodes, one of the third nodes is set as a third gate node according to the moving signal, the fourth group comprises a plurality of fourth nodes, and one of the fourth nodes is set as a fourth gate node according to the moving signal;

receiving at least one data, having a third unit time data length, from each of the third nodes;

calculating a third data aggregation time of the third gate node according to the third unit time data length of the at least one data of each of the third nodes and the default packet length; and receiving a fourth data aggregation time, being calculated according to a fourth unit time data length of at least one data of each of the fourth nodes and the default packet length, from the fourth gate node;

wherein the third gate node is the first gate node, and the fourth gate node is one of the first nodes.

6. The quantity number adjustment method as claimed in claim 5, wherein the step of adjusting the quantity of the first nodes further comprises the steps of:

determining that the third data aggregation time and the fourth data aggregation time are both between a default upper limit time and the default lower limit time; and transmitting a setting signal to set the fourth gate node as the second gate node;

wherein a quantity of the third nodes is smaller than the quantity of the first nodes, and a quantity of the fourth nodes is greater than a quantity of the second nodes.

7. The node quantity adjustment method as claimed in claim 1, wherein the step of adjusting the quantity of the first nodes further comprises the steps of:

receiving a second data aggregation time, being calculated according to a second unit time data length of at least one data of each of the second nodes and the default packet length, from the second gate node;

determining that the first data aggregation time and the second data aggregation time are both smaller than a default lower limit time; and transmitting a separating signal to separate the first nodes into a third group and a fourth group, wherein the third group comprises a plurality of third nodes, one of the third nodes is set as a third gate node according to the separating signal, the fourth group comprises a plurality of fourth nodes, and one of the fourth nodes is set as a fourth gate node according to the separating signal;

wherein the third gate node is the first gate node, the fourth gate node is one of the first nodes, and the quantity of the first nodes is a sum of a quantity of the third nodes and a quantity of the fourth nodes.

8. A non-transitory tangible machine-readable medium storing a program of a node quantity adjustment method for a sensor network, the sensor network comprising a plurality of groups, the groups comprising a first group and a second group, the first group including a plurality of first nodes, one of the first nodes being set as a first gate node, the second group including a plurality of second nodes, one of the second nodes being set as a second gate node, wirelessly connecting to one of the first nodes, the program comprising:

a code A for a reception module to receive at least one data, having a first unit time data length, from each of the first nodes;

a code B for a calculation module to calculate a first data aggregation time of the first gate node according to the first unit time data length of the at least one data of each of the first nodes and a default packet length, wherein the first data aggregation time is the time of accumulating the at least one data and the time of transmitting the at least one data to a sink node; and a code C for an adjustment module to adjust a quantity of the first nodes according to the first data aggregation time;

wherein the first data aggregation time is calculated according to a follow equation:

$$T = \frac{P \times S}{\sum_{i=0}^{i=N-1} \lambda_i \times CR}$$

wherein T represents the first data aggregation time, P represents a data error rate, S represents the default packet length, $\lambda_i$ represents the first unit time data length of the at least one data of each of the first nodes, N represents the quantity of the first nodes, and CR represents a data compression rate.

9. The non-transitory tangible machine-readable medium as claimed in claim 8, wherein the code C further comprises:

a code C1 for a determination unit to determine that the first data aggregation time is greater than a default upper limit time;

a code C2 for a processing unit to transmit a moving signal via a transmission module to move at least one of the second nodes to the first group, so that to cancel the set of the second gate node, and to form a third group and a fourth group, wherein the third group comprises a plurality of third nodes, one of the third nodes is set as a third gate node according to the moving signal, the fourth group comprises a plurality of fourth nodes, and one of the fourth nodes is set as a fourth gate node according to the moving signal;

a code C3 for the reception module to receive at least one data, having a third unit time data length, from each of the third nodes;

a code C4 for the calculation module to calculate a third data aggregation time of the third gate node according to the third unit time data length of the at least one data of each of the third nodes and the default packet length; and a code C5 for the reception module to receive a fourth data aggregation time, being calculated according to a fourth unit time data length of at least one data of each of the fourth nodes and the default packet length, from the fourth gate node;

wherein the third gate node is the first gate node, and the fourth gate node is one of the second nodes.

10. The non-transitory tangible machine-readable medium as claimed in claim 9, wherein the code C further comprises:

a code C6 for the determination unit to determine that the third data aggregation time and the fourth data aggregation time are both between the default upper limit time and a default lower limit time; and a code C7 for the processing unit to transmit a setting signal via the transmission module to set the fourth gate node as the second gate node;

wherein a quantity of the third nodes is greater than the quantity of the first nodes, and a quantity of the fourth nodes is smaller than a quantity of the second nodes.

11. The non-transitory tangible machine-readable medium as claimed in claim 8, wherein the code C further comprises:

a code C1 for the reception module to receive a second data aggregation time, being calculated according to a second unit time data length of at least one data of each of the second nodes and the default packet length, from the second gate node;

a code C2 for a determination unit to determine that the first data aggregation time and the second aggregation time are both greater than a default upper limit time; and a code C3 for a processing unit to transmit a cancellation signal via a transmission module to cancel the set of the second gate node, so that to form a third group, wherein the third group comprises a plurality of third nodes, and one of the third nodes is set as a third gate node according to the cancellation signal;

wherein the third gate node is the first gate node, a quantity of the third nodes is a sum of a quantity of the first nodes and a quantity of the second nodes.

12. The non-transitory tangible machine-readable medium as claimed in claim 8, wherein the code C further comprises:

a code C1 for a determination unit to determine that the first data aggregation time is smaller than a default lower limit time;

a code C2 for a processing unit to transmit a moving signal via a transmission module to move at least one of the first nodes to the second group, so that to cancel the set of the second gate node, and to form a third group and a fourth group, wherein the third group comprises a plurality of third nodes, one of the third nodes is set as a third gate node according to the moving signal, the fourth group comprises a plurality of fourth nodes, and one of the fourth nodes is set as a fourth gate node according to the moving signal;

a code C3 for the reception module to receive at least one data, having a third unit time data length, from each of the third nodes;

a code C4 for the calculation module to calculate a third data aggregation time of the third gate node according to the third unit time data length of the at least one data of each of the third nodes and the default packet length; and a code C5 for the reception module to receive a fourth data aggregation time, being calculated according to a fourth unit time data length of at least one data of each of the fourth nodes and the default packet length, from the fourth gate node;

wherein the third gate node is the first gate node, and the fourth gate node is one of the first nodes.

13. The non-transitory tangible machine-readable medium as claimed in claim 12, wherein the code C further comprises:
a code C7 for the determination unit to determine that the third data aggregation time and the fourth data aggregation time are both between a default upper limit time and the default lower limit time; and
a code C7 for the processing unit to transmit a setting signal via the transmission module to set the fourth gate node as the second gate node;
wherein a quantity of the third nodes is smaller the quantity of the first nodes, and a quantity of the fourth nodes is greater than a quantity of the second nodes.

14. The non-transitory tangible machine-readable medium as claimed in claim 8, wherein the code C further comprises:
a code C1 for the reception module to receive a second data aggregation time, being calculated according to a second unit time data length of at least one data of each of the second nodes and the default packet length, from the second gate node;
a code C2 for a determination unit to determine that the first data aggregation time and the second data aggregation time are both smaller than a default lower limit time; and
a code C3 for a processing unit to transmit a separating signal via a transmission module to separate the first nodes into a third group and a fourth group, wherein the third group comprises a plurality of third nodes, one of the third nodes is set as a third gate node according to the separating signal, the fourth group comprises a plurality of fourth nodes, and one of the fourth nodes is set as a fourth gate node according to the separating signal;
wherein the third gate node is the first gate node, the fourth gate node is one of the first nodes, and the quantity of the first nodes is a sum of a quantity of the third nodes and a quantity of the fourth nodes.

15. A node apparatus for a sensor network, the sensor network comprising a plurality of groups, the groups comprising a first group and a second group, the first group including a plurality of first nodes, one of the first nodes being set as a first gate node, the second group including a plurality of second nodes, one of the second nodes being set as a second gate node, wirelessly connecting to one of the first nodes, the node apparatus comprising:
a transmission module;
a reception module being configured to receive at least one data, having a first unit time data length, from each of the first nodes;
a memory being configured to store a default packet length;
a calculation module being configured to calculate a first data aggregation time of the first gate node according to the first unit time data length of the at least one data of each of the first nodes and the default packet length, wherein the first data aggregation time is the time of accumulating the at least one data and the time of transmitting the at least one data to a sink node; and
an adjustment module being configure to adjust a quantity of the first nodes according to the first data aggregation time;
wherein the first data aggregation time is calculated according to a follow equation:

$$T = \frac{P \times S}{\sum_{i=0}^{i=N-1} \lambda_i \times CR}$$

wherein T represents the first data aggregation time, P represents a data error rate, S represents the default packet length, $\lambda_i$ represents the first unit time data length of the at least one data of each of the first nodes, N represents the quantity of the first nodes, and CR represents a data compression rate.

16. The node apparatus as claimed in claim 15, wherein the memory further stores a default upper limit time, the adjustment module further comprises:
a determination unit being configured to determine the first data aggregation time is greater than the default upper limit time; and
a processing unit being configured to transmit a moving signal via the transmission module to move at least one of the second nodes to the first group, so that to cancel the set of the second gate node, and to form a third group and a fourth group, wherein the third group comprises a plurality of third nodes, one of the third nodes is set as a third gate node according to the moving signal, the fourth group comprises a plurality of fourth nodes, and one of the fourth nodes is set as a fourth gate node according to the moving signal;
wherein the reception module receives at least one data, having a third unit time data length, from each of the third nodes, the calculation module calculates a third data aggregation time of the third gate node according to the third unit time data length of the at least one data of each of the third nodes and the default packet length, the reception module further receives a fourth data aggregation time, being calculated according to a fourth unit time data length of at least one data of each of the fourth nodes and the default packet length, from the fourth gate node; and
wherein the third gate node is the first gate node, and the fourth gate node is one of the second nodes.

17. The node apparatus as claimed in claim 16, wherein the memory further stores a default lower limit time, when the determination unit determines that the third data aggregation time and the fourth data aggregation time are both between the default upper limit time and the default lower limit time, the processing unit transmit a setting signal via the transmission module to set the fourth gate node as the second gate node, a quantity of the third nodes is greater than the quantity of the first nodes, and a quantity of the fourth nodes is smaller than a quantity of the second nodes.

18. The node apparatus as claimed in claim 15, wherein the memory further stores a default upper limit time, the reception module receives a second data aggregation time, being calculated according to a second unit time length of at least one data of each of the second nodes and the default packet length, from the second gate node, the adjustment module further comprises:
a determination unit being configured to determine that the first data aggregation time and the second data aggregation time are both greater than the default upper limit time; and
a processing unit being configure to transmit a cancellation signal via the transmission module to cancel the set of the second gate node, so that to form a third group, wherein the third group comprises a plurality of third nodes, and one of the third nodes is set as a third gate node according to the cancellation signal;

wherein the third gate node is the first gate node, and a quantity of the third nodes is a sum of a quantity of the first nodes and a quantity of the second nodes.

19. The node apparatus as claimed in claim 15, wherein the memory further stores a default lower limit time, the adjustment module further comprises:

a determination unit being configured to determine that the first data aggregation time is smaller than the default lower limit time; and a processing unit being configured to transmit a moving signal via the transmission module to move at least one of the first nodes to the second group, so that to cancel the set of the second gate node, and to form a third group and a fourth group, wherein the third group comprises a plurality of third nodes, one of the third nodes is set as a third gate node according to the moving signal, the fourth group comprises a plurality of fourth nodes, and one of the fourth nodes is set as a fourth gate node according to the moving signal;

wherein the reception module receives at least one data, having a third unit time data length, from each of the third nodes, the calculation module calculates a third data aggregation time of the third gate node according to the third unit time data length of the at least one data of each of the third nodes and the default packet length, the reception module further receives a fourth data aggregation time of the fourth gate node, being calculated according to a fourth unit time data length of at least one data of each of the fourth nodes and the default packet length, from the fourth gate node; and wherein the third gate node is the first gate node, and the fourth gate node is one of the second nodes.

20. The node apparatus as claimed in claim 19, wherein the memory further stores a default upper limit time, when the determination unit determines that the third data aggregation time and the fourth data aggregation time are both between the default upper limit time and the default lower limit time, the processing unit transmit a setting signal via the transmission module to set the fourth gate node as the second gate node, a quantity of the third nodes is greater than the quantity of the first nodes, and a quantity of the fourth nodes is smaller than a quantity of the second nodes.

21. The node apparatus as claimed in claim 15, wherein the memory further stores a default lower limit time, the reception module receives a second data aggregation time of the second gate node, being calculated according to a second unit time of at least one data of each of the second nodes and the default packet length, from the second gate node, the adjustment module further comprises:

a determination unit being configured to determine that the first data aggregation time and the second data aggregation time are both smaller than the default lower limit time; and a processing unit being configured to transmit a separating signal via the transmission module to separate the first nodes into a third group and a fourth group, wherein the third group comprises a plurality of third nodes, one of the third nodes is set as a third gate node according to the separating signal, the fourth group comprises a plurality of fourth nodes, and one of the fourth nodes is set as a fourth gate node according to the separating signal;

wherein the third gate node is the first gate node, the fourth gate node is one of the first nodes, and the quantity of the first nodes is a sum of a quantity of the third nodes and a quantity of the fourth nodes.

* * * * *